Patented July 9, 1946

2,403,804

UNITED STATES PATENT OFFICE 2,403,804

DI-P-ISOBUTYL SEBACATE

George Kesslin, New York, and Leonard Nicholl, Nyack, N. Y., assignors to Kay-Fries Chemicals, Inc., West Haverstraw, N. Y., a corporation of New York No Drawing. Application December 2, 1943, Serial No. 512,638

3 Claims. (Cl. 260—485)

This invention relates to a novel chemical compound di-p-isobutyl sebacate, the method of making same, and to elastomers in which it is incorporated as a plasticizer.

In the present day accelerated development of synthetic rubber plastic compounds, or, more properly speaking, elastomers, there has been a crying need for plasticizers which will impart to the elastomers a desired low temperature flexibility. In the use of synthetic rubbers for equipment in polar regions under sub-arctic conditions, as well as for industrial uses in refrigeration and low temperature work generally, it has been found that elastomers or synthetic rubbers are not plasticized or flexibilized properly, to stand under low temperature working conditions. This is particularly true with the general run of plasticizers used for rubber and rubber substitutes. In the development of the newer elastomers, including those of the butadiene-acrylonitrile types, frangibility at low temperatures is very marked. This condition has been overcome by incorporating therewith a suitable plasticizer, such as di-p-isobutyl sebacate recently prepared and discovered by us. This compound may be incorporated in varying amounts in an elastomer of the butadiene-acrylonitrile type, although in amounts varying from 10 to 25% of the elastomer it has been found to give excellent results, particularly the much desired "low temperature flexibility" now so highly sought after.

The novel compound of the present invention may be prepared in the following manner: 670 lbs. of p-isobutyl alcohol are charged into a 150 gallon still. The liquid is raised to a temperature of approximately 80° C. and while stirring, 435 lbs. of 97.5% sebacic acid are added as rapidly as convenient, and usually in a one to two hour time period. To the mixture in the still there is added 3.8 lbs. of concentrated sulphuric acid as a catalyst, and the still is closed. The temperature of the reaction mixture is increased until the liquid temperature has risen to approximately 99° C. In a practical operation, at this temperature, a constant boiling mixture of p-isobutyl alcohol and water forms and begins to distill over. A sufficient quantity of the constant boiling mixture is distilled over to remove all the water. At this stage of the process the liquid temperature in the still will have reached 133° C. and the vapor temperature approximately 97° C. 100% esterification of the acid by the alcohol is indicated when a test sample on titration requires approximately .8 cc. of N/10 NaOH per 1 cc. of sample. The crude ester product is then treated with 7.8 lbs. of anhydrous sodium carbonate (100% excess for the indicated acidity). The crude product is then distilled without a dephlegmator and under a low vacuum of 140 mm. to remove residual primary isobutyl alcohol. Thereafter the di-p-isobutyl sebacate is distilled over, preferably under a high vacuum of 2 mm. to 4 mm. with corresponding variations in liquid temperature. Generally, the more the pressure used approaches atmospheric pressure, the higher the distillation temperature will have to be.

A typical distillation run is as follows:

[Total weight of batch—805 lbs.]

| Fract. | Liq. temp. | Vap. temp. | Press. | Weight fract. | Ester No. | Acidity as sebacic acid | Remarks |
|---|---|---|---|---|---|---|---|
| | Degrees | Degrees | Mm. | Pounds | Percent | Percent | |
| 1 | 78–145 | 65–50 | 140–2 | 132 | .2 | | Practically pure isobutyl alcohol. |
| 2 | 154 | 154 | 2 | 41 | 98.8 | .081 | Good product. |
| 3 | 154 | 154 | 2 | 575 | 99.2 | .081 | Do. |
| 4 | | | | 51.6 | | | Residue. |

The reaction described above can be graphically illustrated by the following equation:

(1) $\text{COOH}$
   $|$
   $(\text{CH}_2)_8 + 2\text{CH}_3\text{CH}\ \text{CH}_2\text{OH} \xrightarrow{\text{H}_2\text{SO}_4}$
   $|\qquad\qquad\qquad |$
   $\text{COOH}\qquad\quad \text{CH}_3$ Sebacic acid    Primary isobutyl alcohol

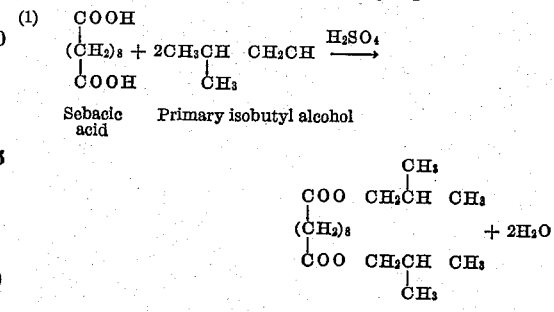

Di-primary isobutyl sebacate

It will be appreciated that there has been provided a novel compound di-p-isobutyl sebacate, particularly suited as a plasticizer for elastomers of the butadiene-acrylonitrile type, and particularly adapted to impart "low temperature flexibility" to them and other elastomers.

What is claimed is:

1. Di-p-isobutyl sebacate.

2. The method of preparing di-p-isobutyl sebacate, comprising esterifying p-isobutyl alcohol and sebacic acid in the presence of sulphuric acid as a catalyst, the p-isobutyl alcohol being in substantial excess, heating to 99° C. to complete the reaction and form a constant boiling mixture of p-isobutyl alcohol and water and distilling off same during the course of the reaction, leaving the newly formed di-p-isobutyl sebacate dissolved in anhydrous residual primary isobutyl alcohol, neutralizing the reaction mixture with anhydrous sodium carbonate, then distilling under low vacuum to remove residual primary isobutyl alcohol followed by distillation at high vacuum to secure pure di-p-isobutyl sebacate.

3. The method of preparing di-p-isobutyl sebacate, comprising reacting 670 lbs. of p-isobutyl alcohol with 435 lbs. of sebacic acid, and in the presence of 3.84 lbs. of sulphuric acid; heating the reaction mixture to 99° C. to form di-p-isobutyl sebacate and a constant boiling mixture of p-isobutyl alcohol and water, heating the liquid to approximately 133° C. to remove the so formed constant boiling mixture and leave a residue of di-p-isobutyl sebacate dissolved in the excess of p-isobutanol; adding 7.8 lbs. of anhydrous sodium carbonate to the residue, distilling the treated product under a low vacuum of 140 mm. to remove primary isobutyl alcohol, and then under a high vacuum of 2 mm. to distill off the pure di-p-isobutyl sebacate.

GEORGE KESSLIN.
LEONARD NICHOLL.